(12) United States Patent
Wang et al.

(10) Patent No.: US 7,188,235 B2
(45) Date of Patent: Mar. 6, 2007

(54) METHOD FOR BOOTING COMPUTER SYSTEM WITH MEMORY CARD

(75) Inventors: Cheng-Chih Wang, Hsinchu (TW); Meng-Chyi Wu, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 442 days.

(21) Appl. No.: 10/624,804

(22) Filed: Jul. 22, 2003

(65) Prior Publication Data

US 2005/0021933 A1    Jan. 27, 2005

(51) Int. Cl.
*G06F 9/00* (2006.01)
*G06F 9/24* (2006.01)
*G06F 15/177* (2006.01)

(52) U.S. Cl. .............................................. 713/1; 713/2
(58) Field of Classification Search ............... 713/1, 713/2, 100
See application file for complete search history.

(56) References Cited

U.S. PATENT DOCUMENTS

| | | | |
|---|---|---|---|
| 5,247,659 A * | 9/1993 | Curran et al. .................. | 713/1 |
| 5,363,446 A * | 11/1994 | Ruppertz et al. .............. | 713/1 |
| 5,410,707 A * | 4/1995 | Bell ................................ | 713/2 |
| 6,041,413 A * | 3/2000 | Wang ............................ | 726/19 |
| 6,122,734 A * | 9/2000 | Jeon ............................... | 713/2 |
| 6,158,002 A * | 12/2000 | Kwan et al. ................... | 713/2 |
| 6,453,414 B1 * | 9/2002 | Ryu ............................... | 713/2 |
| 6,505,263 B1 * | 1/2003 | Larson et al. ............... | 710/100 |
| 6,550,007 B1 * | 4/2003 | Baxter et al. ................. | 713/2 |
| 6,725,382 B1 * | 4/2004 | Thompson et al. ........... | 726/19 |
| 6,754,818 B1 * | 6/2004 | Lee et al. ...................... | 713/2 |
| 2003/0050938 A1 * | 3/2003 | Peng et al. ................. | 707/200 |
| 2003/0051125 A1 * | 3/2003 | Lu ................................. | 713/1 |
| 2003/0145191 A1 * | 7/2003 | Park .............................. | 713/1 |
| 2003/0200379 A1 * | 10/2003 | Hollingsworth et al. .... | 711/103 |

* cited by examiner

*Primary Examiner*—Thuan N. Du
*Assistant Examiner*—James F. Sugent
(74) *Attorney, Agent, or Firm*—Volpe and Koenig, P.C.

(57) ABSTRACT

A method for initiating a computer system through a memory card is provided. The computer system includes a memory card reading device, a control circuit, and a basic input-output system memory. The method includes steps of providing the memory card storing therein a basic input-output system, inserting the memory card into the memory card reading device, selecting a path of initiating the computer system through the memory card, disabling the basic input-output system memory by the control circuit, and initiating the computer system through reading the basic input-output system by the control circuit.

20 Claims, 1 Drawing Sheet

METHOD FOR BOOTING COMPUTER SYSTEM WITH MEMORY CARD

FIELD OF THE INVENTION

This invention relates to a method for booting a computer system, and especially to one method of using a memory card for booting a computer system.

BACKGROUND OF THE INVENTION

A so-called basic input-output system (BIOS) is the most basic software for the basic computer operation in the present computer structure. BIOS is mainly composed of the low-level instruction sets in the computer, which is used for providing the most basic hardware checking, defining the characteristics of the computer, and managing the basic procedure in the computer operation. For instance, while the computer is booted, the BIOS runs the booting self-checking, annotates the signals from the keyboard, transmits the information between the connecting ports, and so forth. Therefore, the initial operation of computer booting is carried out by the contents of the BIOS. If some mistakes happen in the BIOS, the computer can't run the checking of the memory, the hard disk, and the central processing unity during the computer booting, then the computer can't be booted successfully.

Since the BIOS plays a decisive role in the computer system, generally the instruction program set of the BIOS is burned into a memory, such as flash read-only memory (Flash ROM), programmable read-only memory (PROM), erasable programmable read-only memory (EPROM), electrically erasable programmable read-only memory (EEPROM), and so forth, which can function for a long time without supplying any power. Therefore, such a BIOS memory is always attached on the motherboard and its contents are preserved forever without being affected by the power supply.

However, the contents of the BIOS memory are not always completely correct. When the circuit structure of the BIOS memory is degraded as time goes by or is destroyed by computer viruses, the contents of the BIOS memory may be lost or some errors may occur therein. As a result, the errors of running the BIOS instruction program set will occurred while booting the computer. Therefore, the bootstrap of the computer will not be complete.

In the present market, a known method for avoiding the virus from destructing the BIOS memory is to use two BIOS memories. One is the main BIOS memory, and the other is the backup BIOS memory. The writable function of the backup BIOS memory is disabled forever. When the main BIOS memory is destroyed by the virus, the backup BIOS memory is used for booting the computer. Such this design needs two BIOS memories, not only lots of space in the motherboard will be occupied by the BIOS memories., but also the cost is much higher.

According to the above-mentioned, a method for ensuring a successful booting process with less cost and compacter structure is badly needed for the industry. Therefore, a method for booting a computer system through a memory card is provided in the present invention.

Because of the technical defects described above, the applicant keeps on carving unflaggingly to develop "METHOD FOR BOOTING COMPUTER SYSTEM WITH MEMORY CARD" through wholehearted experience and research.

SUMMARY OF THE INVENTION

It is a main object of the present invention to provide a method for booting the computer by the BIOS stored in the integrated circuit (IC) memory card. Therefore, it is not necessary to increase the motherboard space in the computer system for containing the BIOS memory. Further, the remained space of the IC memory card can be used for storing other data.

It is another object of the present invention to provide a method for maintaining the security of the computer system and increasing the portability of the operating system (OS) by storing the password and operating system in the IC memory card.

In accordance with one aspect of the present invention, a method for initiating a computer system through a memory card is provided. The computer system includes a memory card reading device, a control circuit, and a basic input-output system memory. The method includes steps of a) providing the memory card storing therein a basic input-output system, b) inserting the memory card into the memory card reading device, c) selecting a path of initiating the computer system through the memory card, d) disabling the basic input-output system memory by the control circuit, and e) initiating the computer system through reading the basic input-output system by the control circuit.

Preferably, the control circuit is connected to a chipset of the computer system and the basic input-output basic memory via one of a low pin count interface and a peripheral component interconnect interface.

Preferably, the control circuit is controlled by a selective initiating signal to initiate the computer system through the memory card.

Preferably, the selectively initiating signal is initiated by a key on a panel of the computer system.

Preferably, the control circuit is electrically connected to the memory card reading device and a power supply of the computer system respectively.

Preferably, the power supply is an ATX power supply and provides a standby power.

Preferably, the power supply is electrically connected to a motherboard of the computer system.

Preferably, the memory card is one selected from a group consisting of a secure digital card, a memory stick, and a multimedia card.

In accordance with another aspect of the present invention, a method for booting a computer system with a memory card reading device, and a control circuit storing a first password is provided. The method includes steps of a) providing a memory card having a second password and a basic input-output system stored therein, b) inserting the memory card into the memory card reading device, c) reading the second password by the control circuit, d) comparing the second password with the first password, and e) booting the computer system by reading the basic input-output system by the control circuit while the second password and the first password are identical to each other.

Preferably, the control circuit is connected to a chipset of the computer system via one of a low pin count interface and a peripheral component interconnect interface.

Preferably, the control circuit is electrically connected to the memory card reading device and a power supply of the computer system respectively.

Preferably, the power supply is an ATX power supply and provides a standby power.

Preferably, the power supply is electrically connected to a motherboard of the computer system.

Preferably, the memory card is one selected from a group consisting of a secure digital card, a memory stick, and a multimedia card.

In accordance with another aspect of the present invention, a method for booting a computer system having a memory card reading device and a control circuit is provided. The method includes steps of a) providing a memory card having a basic input-output system and a operating system stored therein, b) inserting the memory card into the memory card reading device, c) booting the computer system through reading the basic input-output system by the control circuit, and d) reading the operating system through the control circuit for operating the computer system.

Preferably, the control circuit is connected to a chipset of the computer system via one of a low pin count interface and a peripheral component interconnect interface.

Preferably, the control circuit is electrically connected to the memory card reading device and a power supply of the computer system respectively.

Preferably, the power supply is an ATX power supply and provides a standby power.

Preferably, the power supply is electrically connected to a motherboard of the computer system.

Preferably, the memory card is one selected from a group consisting of a secure digital card, a memory stick, and a multimedia card.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
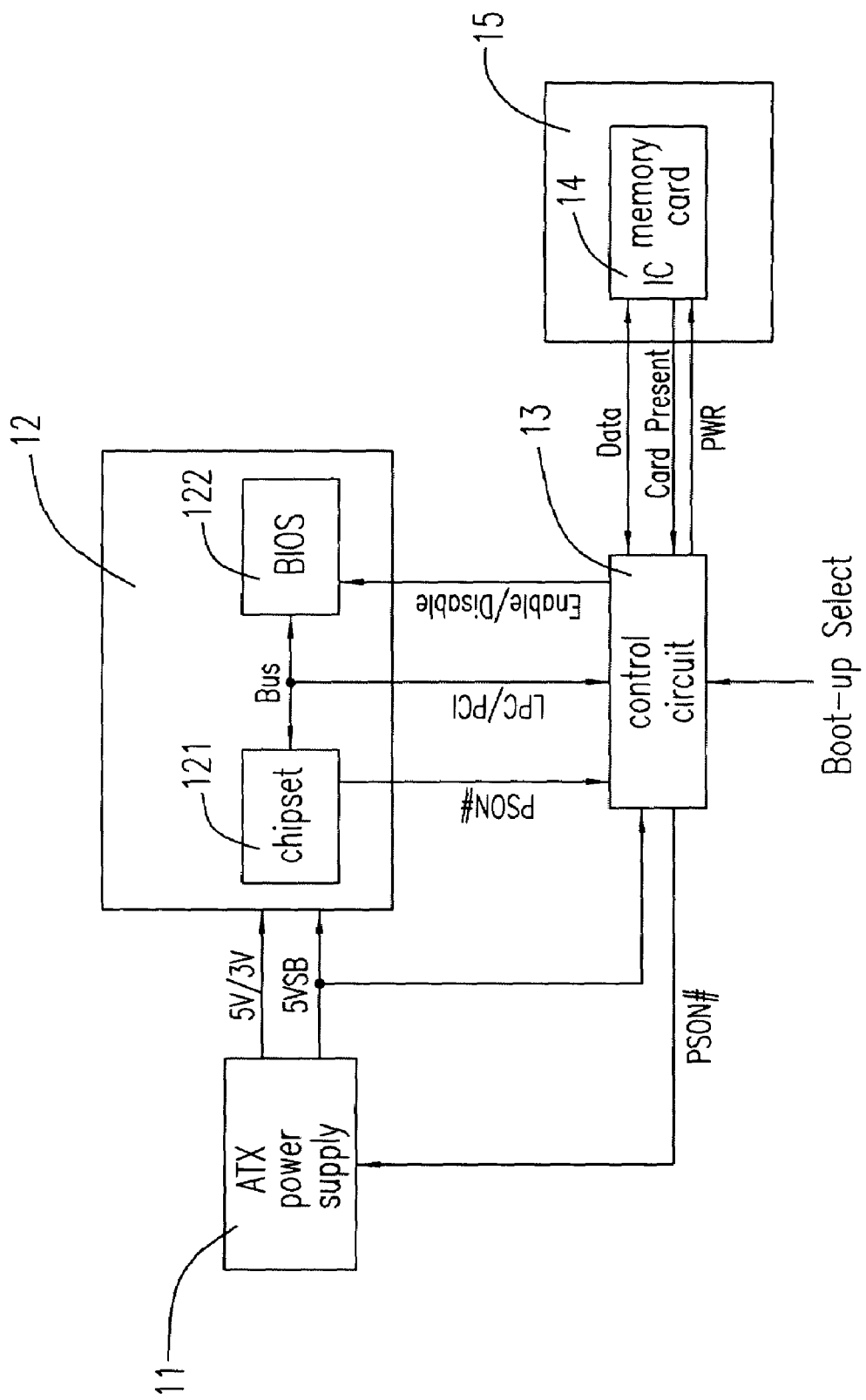
FIG. 1 is the block diagram illustrating the circuit of booting the computer system by the memory card according to a preferred embodiment of the present invention.

The present invention will now be described more specifically with reference to the following embodiments. Nowadays, various IC memory cards can be found in the market, such as a secure digital card (SD), a memory stick (MS), a multimedia card (MMC), and so forth. Some of them are accessed via the universal serial bus (UBS), and their main functions are data storage. Since the IC memory card can directly access the interface of the BIOS memory via one of a low pin count (LPC) and a peripheral component interconnect (PCI), the IC memory card is used as the backup of the BIOS memory in the present invention. Therefore, it is possible to avoid the failed booting even though when the BIOS memory is suffered from the virus attack or the artificial destructions.

Please refer to FIG. 1, which is the block diagram illustrating the circuit of booting the computer system by the memory card according to a preferred embodiment of the present invention. The computer system includes the motherboard 12, the power supply 11, the control circuit 13, and the memory card reading device 15. In which, the chipset 121 and the BIOS memory 122 are disposed on the motherboard 12. The chipset 121 and the BIOS memory 122 are electrically connected with the control circuit 13 via one of a LPC interface and a PCI interface. The control circuit 13 is electrically connected to the power supply 11 and the memory card reading device 15 respectively. The power supply 11 is used to provide a standby power to the motherboard 12 and the control circuit 13. The memory card reading device 15 is used for reading the IC memory card 14.

The IC memory card 14 stores a BIOS. When it is unable to boot the computer system by the BIOS memory 122 of the computer system, which is suffered from a virus attack or an artificial destruction, the user can insert the IC memory card 14 into the memory card reading device 15 and press a specific key (not shown) on the panel (not shown) of the computer system to start a boot-up select. When the user presses the specific key, the boot-up select is transmitted to the control circuit 13. After the control circuit 13 receives the boot-up select, the control circuit 13 sends a disabled signal for disabling the BIOS memory 122 of the computer system, and then reads the BIOS of the IC memory card 14 for booting the computer system.

The other function of the present invention is to store a password in the BIOS memory of the IC memory card. At this time, there is no BIOS memory disposed on the motherboard or the BIOS memory disposed on the motherboard is disabled forever. When the IC memory card is inserted into the memory card reading device, the control circuit reads the password stored in the memory card first, and then compares it with the original password. The computer is booted only when the comparing result is matched. In other words, a function of security maintenance is achieved by the above description. The relevant steps are illustrated as follows.

Please refer to FIG. 1 again. The IC memory card 14 storing a second password and a BIOS is provided. Then, the IC memory card 14 is inserted into the memory card reading device 15. The control circuit 13 reads the second password stored in the IC memory card 14, and compares the second password with the first password stored in the control circuit 13. When the second password and the first password are identical with each other (the comparison is matched), the control circuit 13 reads the BIOS stored in the IC memory card 14. Then, the Power Supply on Signal (PSON#) transmitted from the chipset 121 is shifted to low. When the PSON# is low, the power supply 11 is initiated to provide the electricity to the motherboard 12 and therefore the computer system is booted.

The control circuit 13 holds the POSN# transmitted from the chipset 121. Only when the second password is identical to the first password, the PSON# is shifted to low. And then, the operation of the computer system is booted. When the second password is not identical to the first password, (the comparison is not matched), the PSON# is kept at "high" status. Then, the power supply 11 can not be initiated. And, the operation of the computer system is unable to be booted.

The IC memory card 14 used in the present invention can store an operating system, such as DOS, WINDOWS, and so forth. Therefore, after the computer system is booted to function, the computer system will read the operating system stored in the IC memory card 14 at once. Therefore, the IC memory card 14 is as convenient as a portable operating system.

As described above, the present invention provides a method for booting a computer system by a BIOS stored in a memory card. Therefore, it is unnecessary to increase the space of the motherboard and the remained space of the memory card can be used for data storage. In addition, the present invention provides a method for maintaining the security of the computer system and increasing the portability of the operating system (OS) by storing the password and operating system in the IC memory card. Thus, the present invention effectively improves the defaults of the prior arts and is valuable for the industries.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for initiating a computer system through a memory card, wherein said computer system comprises a memory card reading device, a control circuit, and a basic input-output system memory where said control circuit is connected to a chipset of said computer system and said basic input-output basic memory via one of a low pin count interface and a peripheral component interconnect interface, comprising steps of:
    a) providing said memory card storing therein a full basic input-output system for conducting hardware checking. defining a characteristic of said computer system and managing a basic procedure in a computer operation;
    b) inserting said memory card into said memory card reading device;
    c) selecting a path of initiating said computer system through said memory card;
    d) disabling said basic input-output system memory by said control circuit; and
    e) initiating said computer system through reading said basic input-output system by said control circuit.

2. The method as claimed in claim 1, wherein said control circuit is controlled by a selectively initiating signal to initiate said computer system through said memory card.

3. The method as claimed in claim 2, wherein said selective initiating signal is initiated by a key on a panel of said computer system.

4. The method as claimed in claim 1, wherein said control circuit is electrically connected to said memory card reading device and a power supply of said computer system respectively.

5. The method as claimed in claim 4, wherein said power supply is an ATX power supply and provides a standby power.

6. The method as claimed in claim 4, wherein said power supply is electrically connected to a motherboard of said computer system.

7. The method as claimed in claim 1, wherein said memory card is one selected from a group consisting of a secure digital card, a memory stick, and a multimedia card.

8. A method for booting a computer system having a memory card reading device, and a control circuit storing a first password where said control circuit is connected to a chipset of said computer system via one of a low pin count interface and a peripheral component interconnect interface, comprising steps of:
    a) providing a memory card having a second password and a full basic input-output system stored therein for conducting hardware checking, defining a characteristic of said computer system and managing a basic procedure in a computer operation;
    b) inserting said memory card into said memory card reading device;
    c) reading said second password by said control circuit;
    d) comparing said second password with said first password; and
    e) booting said computer system by reading said basic input-output system by said control circuit while said second password and said first password are identical to each other.

9. The method as claimed in claim 8, wherein said control circuit is electrically connected to said memory card reading device and a power supply of said computer system respectively.

10. The method as claimed in claim 9, wherein said power supply is an ATX power supply.

11. The method as claimed in claim 9, wherein said power supply is electrically connected to a motherboard of said computer system.

12. The method as claimed in claim 8, wherein said memory card is one selected from a group consisting of a secure digital card, a memory stick, and a multimedia card.

13. A method for booting a computer system having a memory card reading device, and a control circuit where said control circuit is connected to a chipset of said computer system via one of a low pin count interface and a peripheral component interconnect interface, comprising steps of:
    a) providing a memory card having a full basic input-output system for conducting hardware checking. defining a characteristic of said computer system and managing a basic procedure in a computer operation and a having an operating system stored therein;
    b) inserting said memory card into said memory card reading device;
    c) booting said computer system through reading said basic input-output system by said control circuit; and
    d) reading said operating system through said control circuit for operating said computer system.

14. The method as claimed in claim 13, wherein said control circuit is electrically connected to said memory card reading device and a power supply of said computer system respectively.

15. The method as claimed in claim 14, wherein said power supply is an ATX power supply and provides a standby power.

16. The method as claimed in claim 14, wherein said power supply is electrically connected to a motherboard of said computer system.

17. The method as claimed in claim 13, wherein said memory card is one selected from a group consisting of a secure digital card, a memory stick, and a multimedia card.

18. A computer system configured for auxiliary basic input-output system booting through a memory card comprising:
    a memory card reading device;
    a control circuit;
    a basic input-output system memory;
    a chipset;
    said control circuit connected to the chipset and said basic input-output basic memory via one of a low pin count interface and a peripheral component interconnect interface;
    said memory card reading device configured to receive a memory card having a full basic input-output system for conducting hardware checking, defining a characteristic of said computer and managing a basic procedure in a computer operation; and
    said control circuit configured such that insertion said memory card into said memory card reading device enables selection of a path for initiating said computer system through said memory card, disabling of said basic input-output system memory by said control circuit, and initiation of said computer system through reading said basic input-output system on said memory card by said control circuit.

19. A computer system configured for auxiliary basic input-output system booting through a memory card comprising:
   a memory card reading device;
   a chipset;
   a control circuit configured to store a first password;
   said control circuit connected to said chipset via one of a low pin count interface and a peripheral component interconnect interface, comprising steps of:
   said memory card reading device configured to receive a memory card having a second password and a full basic input-output system stored therein for conducting hardware checking, defining a characteristic of said computer system and managing a basic procedure in a computer operation; and
   said control circuit configured such that insertion said memory card into said memory card reading device enables reading said second password by said control circuit, comparing said second password with said first password, and booting said computer system by reading said basic input-output system by said control circuit while said second password and said first password are identical to each other.

20. A computer system configured for auxiliary basic input-output system booting through a memory card comprising:
   a memory card reading device;
   a chipset;
   a control circuit connected to said chipset via one of a low pin count interface and a peripheral component interconnect interface;
   said memory card reading device configured to receive a memory card having a full basic input-output system for conducting hardware checking, defining a characteristic of said computer system and managing a basic procedure in a computer operation and having an operating system stored therein; and
   said control circuit configured such that insertion said memory card into said memory card reading device enables booting said computer system through reading said basic input-output system by said control circuit and reading said operating system through said control circuit for operating said computer system.

* * * * *